United States Patent [19]
Kim et al.

[11] Patent Number: 5,490,998
[45] Date of Patent: Feb. 13, 1996

[54] METHOD FOR PREPARING GRAIN CAKE HEALTH SOUP

[76] Inventors: Ki I. Kim, 826 S. Berando St., Apt. 1, Los Angeles, Calif. 90005; Soo K. Rho, 17535 Horace St., Granada Hills, Calif. 91344

[21] Appl. No.: 213,850

[22] Filed: Mar. 16, 1994

Related U.S. Application Data

[63] Continuation-in-part of Ser. No. 190,591, Jan. 31, 1994.

[51] Int. Cl.$^6$ .................................................. A23L 1/238
[52] U.S. Cl. ........................... 426/589; 426/131; 426/574; 426/618; 426/641
[58] Field of Search .................................. 426/397, 407, 426/589, 517, 518, 521, 641, 574, 131, 618

[56] References Cited

U.S. PATENT DOCUMENTS

| | | | |
|---|---|---|---|
| 3,944,655 | 3/1976 | Levin et al. | 426/32 |
| 4,844,918 | 7/1989 | Hoashi | 426/92 |
| 4,888,180 | 12/1989 | Wu | 426/618 |
| 4,963,370 | 10/1990 | Uchida et al. | 426/7 |
| 5,102,677 | 4/1992 | Van Den Berghe | 426/446 |

OTHER PUBLICATIONS

"Woman's Day Encyclopedia of Cookery" 1966 pp. 736–737.
Ethel H. Renwick "The Real Food Cookbook" 1978 p. 163.

*Primary Examiner*—Donald E. Czaja
*Assistant Examiner*—Lien Tran
*Attorney, Agent, or Firm*—Stetina Brunda & Buyan

[57] ABSTRACT

In a method for preparing grain cake health food, a crunchy grain component is prepared separately from a water-saturated meat and/or bone component. The grain cake is prepared according to the steps of: providing grain powder; mixing the grain powder with salt, water, and starch to provide a first mixture; cooking the first mixture to form a cake; pressing the cake to form a cake bar; and freeze drying the cake bar to remove a quantity of water therefrom. The cake bar is partially cooked so as to resist water absorption during storage and becomes fully cooked during final preparation for consumption. At least one of meat and bone is separately prepared according to the steps of: providing at least one of meat and bone; mixing at least one of meat and bone with salt and water to produce a second mixture; cooking the second mixture to form a broth; and cooling the broth. The cake bar and broth are mixed together so as to form a soup and the soup is then dispensed into a container. The container and soup are then frozen. The container is preferably either a tray, a tub, or a pouch. A grain hot dog and method for making the same are also disclosed.

15 Claims, 3 Drawing Sheets

METHOD FOR PREPARING GRAIN CAKE HEALTH SOUP

The subject application is a continuation in part patent application of U.S. Ser. No. 08/190,591, filed on Jan. 31, 1994, and entitled METHOD FOR PRODUCING GRAIN CAKE HEALTH SOUP, the contents of which are hereby incorporated by reference.

FIELD OF THE INVENTION

The present invention relates generally to food products and more particularly to a method for producing grain cake health soup and grain hot dog TV dinners.

BACKGROUND OF THE INVENTION

Soups having both water-saturated and substantially dry or crunchy components are well known. Such soups typically comprise water-saturated meats and/or bone, vegetables, seasonings, etc. and crunchy croutons, crackers, noodles, etc.

Although such soups are very popular and desired in the marketplace, their consumption is typically limited to the home and restaurants wherein the water-saturated components are prepared and served generally separately from the crunchy components thereof, thus preserving the crunchiness thereof. The crunchy components of the soup are typically only added thereto immediately prior to its cooking, if necessary, and consumption.

The components of such soups are sold separately in grocery stores. Thus, a consumer purchases sliced cake bar separately from meat and/or bone soup, then combines the sliced cake bar with the meat and/or bone soup at home. The sliced cake bar and the meat and/or bone soup are then cooked and immediately served.

Previous attempts to provide both the water-saturated soup components and the crunchy soup components together in a common container, i.e., a can, which is sold by grocery stores, supermarkets, and the like have failed in that the crunchy components of the soup become water-saturated and thus lose the desired crunchiness.

Such canned soups inherently require a substantial length of time between their manufacture and final consumption. This length of time is more than adequate for the crunchy components of the soup to absorb a substantial quantity of water, thereby becoming well saturated and thus losing their crunchiness.

The consumption of such soups is particularly popular in North and South Korea. For approximately the past 100 years, almost all North and South Koreans have eaten duk kuk or rice soup (one example of such soups) as the first meal on New Year's Day.

According to contemporary practice, all of the components, i.e., rice cake, meat, bone, and vegetables, of the duk kuk are boiled together, thus requiring that the soup be consumed within approximately 30 minutes after preparation. After approximately 30 minutes, the normally crunchy component of the duk kuk soup becomes water saturated and clumps together, thus rendering the soup undesirable for consumption.

As such, duk kuk soup has not been provided in a can since it must be eaten within 30 minutes of preparation since according to contemporary methodology all of the components thereof are boiled together.

Further, various frozen foods provide a noodle component and a sauce component. In order to avoid excessive and undesirable moisture absorption by the noodle component from the sauce component, such frozen foods are typically disposed within their containers so as to minimize contact between the noodle component and the sauce component thereof. For example, in a TV dinner containing spaghetti, the noodles thereof are typically disposed within the tray at one side thereof, and the sauce component is disposed at the opposite side of the tray. Thus, only minimal contact is provided between the noodle and sauce components of the TV dinner.

According to contemporary methodology, the noodles of such TV dinners are fully cooked during manufacture and are merely warmed by the consumer during final preparation for consumption.

Although such separation of the noodle and sauce components according to contemporary methodology tends to prevent excessive moisture absorption by the noodle component thereof, such separation has an undesirable effect upon the taste of the food.

A discernable and undesirable difference in taste results when the noodles of such frozen foods are cooked separately from the sauce components thereof. Thus, when a spaghetti TV dinner is cooked, the noodles, being separate from the sauce, do not absorb flavor from the sauce in a manner which results in desirable taste thereof.

If the noodles and sauce components of such TV dinners are stored together, the noodles obtain a more desirable flavor, however they expand and become undesirably soft.

As such, it would further be beneficial to provide frozen foods wherein a noodle component thereof is disposed in a configuration mixed with the sauce component thereof, such that cooking of the food results in the noodle being cooked within the sauce, so as to maximize the desirable flavor thereof.

The hot dog is a well-known food wherein a frank or wiener is disposed within a bun. Condiments such as relish, ketchup, mustard, onions, etc. are typically added to suit an individual consumer's taste. The wiener typically comprises a meat such as sausage, pork, beef, turkey, or chicken. The bun is typically comprised of white bread made from flour.

Although the preparation of such hot dogs, which generally comprises cooking the wiener and then placing the wiener and desired condiments within a bun, is relatively simple, further simplification of the preparation process is desirable. This is particularly true since hot dogs are typically thought of as convenience foods wherein the consumer gives great weight to the ability to prepare the food in a fast and easy manner.

Additionally, the storage of the various components of a hot dog present inherent problems. Although such components, i.e., the wiener and bun, can be frozen to extend the life thereof, such freezing inherently complicates the subsequent preparation process. Thus, frozen hot dogs and buns must be thawed out prior to the preparation thereof, thereby undesirably increasing the preparation time thereof.

As such, it is desirable to provide an easily and quickly prepared hot dog which can be stored for prolonged periods of time without undesirably complicating the preparation process thereof.

Thus, although the prior art has recognized to a limited extent the problem of providing frozen TV dinner soups and hot dogs, the proposed solutions have, to date, been ineffective in providing a satisfactory remedy.

SUMMARY OF THE INVENTION

The present invention specifically addresses and alleviates the above-mentioned deficiencies associated with the prior art. More particularly, the present invention comprises a method for producing grain cake health soup and hot dog TV dinners. The method for preparing the grain cake health soup TV dinners comprises the steps of separately preparing a crunchy grain cake component thereof independently from a water-saturated meat and/or bone component thereof. The grain cake is prepared according to the steps of: providing grain powder; mixing the grain powder with salt, water, and starch to provide a first mixture; cooking the first mixture to form a cake; pressing the cake to form a cake bar; and freeze drying the cake bar to remove a quantity of water therefrom.

Preparing the meat and/or bone is performed according to the steps of: providing at least one of meat and bone; mixing at least one of meat and bone with salt and water to produce a second mixture; mixture to form a broth; and cooling the broth.

After the cake bar and broth are dispensed into the container, the container is sealed and the container is then frozen and made ready for distribution, i.e., labeled, packaged, etc. The container and its contents may optionally be sterilized, if desired.

The grain powder preferably comprises at least one of rice, corn, beans, wheat, and momil. The step of cooking the first mixture preferably comprises cooking the first mixture in a pressure steam cooker or pressure boiler. The steps of mixing the grain powder with salt, water, and starch and cooking the first mixture preferably comprise mixing the grain powder and cooking the first mixture in a pressure boiler. The step of pressing the first mixture preferably comprises pressing the first mixture with a roller press.

The step of pressing the first mixture to form a cake bar preferably comprises pressing the first mixture and forming a cake bar configured to have a cross-section defining a circle, a square, or rectangle. The cake bar is then broken or cut into a plurality of small crouton-like pieces. As those skilled in the art will recognize, each individual piece of the bar may comprise various different shapes. While various such shapes are suitable, it is preferred that each piece be generally rectangular in configuration and have a generally concave surface formed at one end thereof and a generally convex surface formed at the opposite end thereof, providing an appearance generally similar to that of a fingernail clipping. It has been found that such shapes do not tend to stick together so as to form water-saturated clumps.

The step of mixing the grain powder with salt, water, and starch preferably comprises mixing the grain powder with salt, water, and starch, as well as seasoning. The amount of starch added determines the hardness of the cake. Thus, the amount of starch added may be varied to vary the hardness of the cake, as desired. The amount of starch utilized is at most one percent, preferably 0.5 percent, by weight of the amount of grain powder utilized.

Additionally, the step of mixing the meat and/or bone with salt and water preferably comprises mixing the meat. and/or bone with salt, water, and also seasoning. The step of cooking the second mixture preferably comprises cooking the second mixture in a pressure boiler. The steps of mixing the meat and/or bone with salt and water and cooking preferably comprise mixing the meat and/or bone with salt and water and cooking the second mixture in a conventional boiler.

Thus, a soup having both water-saturated and substantially crunchy components is provided. The process of separately forming the crunchy and water-saturated components of the soup in combination with the unique shape of the crunchy components thereof thus provides a soup capable of maintaining the desired crunchiness of the crunchy components thereof even during the prolonged time period inherent to the distribution of canned soups.

The substantially crunchy components of the soup are only partially cooked at the time of manufacture thereof and must be further cooked so as to achieve full cooking by the consumer or preparer. By partially cooking the crunch components according to the methodology of the present invention, the crunchy components remain in a state which does not facilitate water absorption, thereby facilitating their storage for prolonged periods, while remaining in contact with the broth component of the soup.

Those skilled in the art will recognize that various different containers are suitable for use in the present invention. Preferably, the container comprises a tray, such as those commonly utilized in TV dinners; a tub; or a pouch. The container is preferably microwave compatible such that the grain cake health soup of the present invention may be cooked therein utilizing a microwave oven.

The method for preparing the hot dog TV dinner similarly comprises the steps of providing grain powder; mixing the grain powder with salt and water to produce a first mixture; steam cooking the first mixture to form a cake; and pressing the cake to produce a cake bar. Ground meat, e.g., beef, pork, turkey, or chicken, is then mixed with salt, water, and seasoning to form a second mixture. The first and second mixtures are then brought together and a grain hot dog is formed utilizing a conventional tube stuffer. The grain hot dog is then re-cooked the recooked grain hot dog is dispensed into a container and refrigerated.

The step of forming the grain hot dog is performed either such that the meat forms the interior and the grain the exterior thereof, or such that the grain forms the interior and the meat forms the exterior thereof. In either instance, the hot dog may optionally be formed by utilizing two different sizes of tube stuffers. The inside layer first being formed in the smaller of the two tube stuffers. After forming the inside layer, the inside layer is placed in the larger tube stuffer and the outside layer is then formed thereabout.

Alternatively, the inside layer could be formed in a tube stuffer and then the outside layer formed thereover by rolling the inside layer in the material of the outside layer. Those skilled in the art will recognize that various other means for forming the two-layered configuration of the grain hot dog of the present invention are likewise suitable.

The grain hot dog of the present invention is preferably generally cylindrical in configuration. Alternatively, the grain hot dog may be generally triangular in cross-section, generally rectangular in cross-section, or of any other desired cross-section.

To prepare the grain hot dog of the present invention for consumption, the user merely cooks the TV dinner in any conventional manner, e.g., via a conventional oven, microwave oven, etc.

Thus, an easy to prepare hot dog having an increased shelf life is provided. Ease of preparation is provided since the user does not have to separately provide a bun therefore, but rather merely heats the grain hot dog TV dinner which is then ready for consumption. The shelf life of the grain hot dog is increased without undesirably complicating the preparation procedure since the frozen meal need merely be heated prior to consumption thereof.

These, as well as other advantages of the present invention, will be more apparent from the following description and drawings. It is understood that changes in the specific methodology shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for practicing the method of the present invention in connection with the illustrated embodiment. It is to be understood, however, that the same or equivalent functions and sequences may be accomplished by different embodiments that are also intended to be encompassed within the spirit and scope of the invention.

Figure 1:
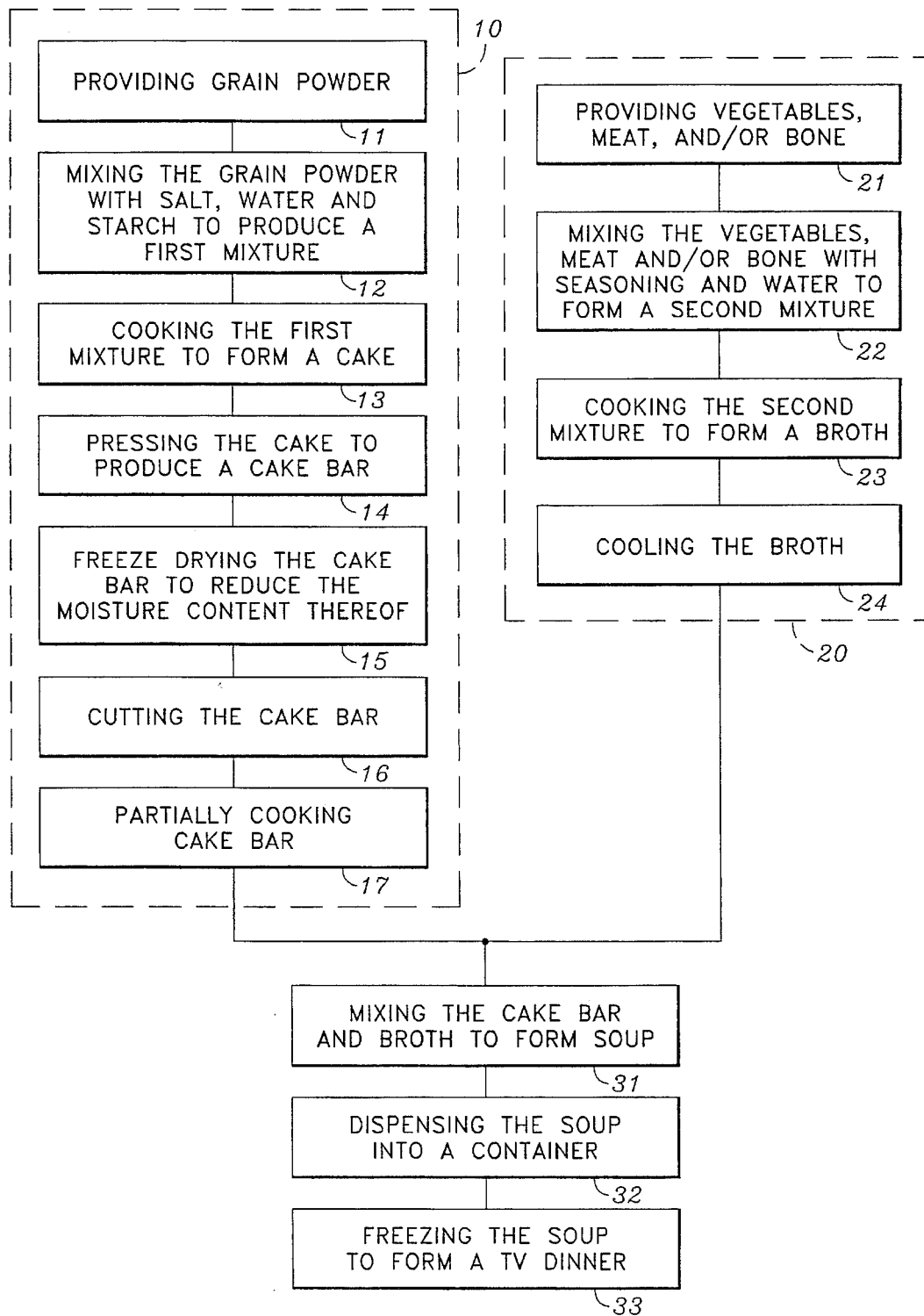
FIG. 1 is a block diagram illustrating the steps for practicing the method of producing grain cake health soup according to the present invention.
Figure 2:
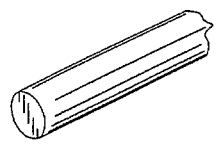
FIG. 2 is a portion of cake bar having a cross-section configured as a circle.
Figure 3:
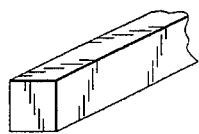
FIG. 3 is a portion of a cake bar having a cross-section configured as a square.
Figure 4:
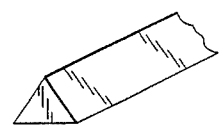
FIG. 4 is a portion of a cake bar having a cross-section configured as a triangle.

The method for producing grain cake health soup according to the present invention is illustrated in FIGS. 1–12 which depict a presently preferred embodiment thereof. Referring now to FIG. 1, the method for producing grain cake health soup according to the present invention comprises separately forming crunchy grain cake, e.g., noodles, independently from meat and/or bone soup and then adding both to a common container, which is subsequently sealed and frozen. The grain cake is formed according to the steps 10 of providing grain powder 11; mixing the grain powder with salt, water, and starch to produce a first mixture 12; cooking the first mixture to form a cake 13; pressing the cake to produce a cake bar 14; freeze drying the cake bar to reduce the water content of the cake bar 15; cutting the cake bar 16; and partially cooking the cake bar 17.

The steps 20 of forming the meat and/or bone soup comprise providing vegetables meat and/or bone 21; mixing the vegetables and meat and/or bone with seasoning and water to produce a second mixture 22; cooking the second mixture to form a broth 23; and cooling the broth 24. Both the cake bar and the meat and/or bone broth are mixed together to form a soup 31. The soup is then dispensed into a container 32 and frozen 33.

The step of partially cooking the cake bar 17 preferably comprises cooking the cake bar to about ½ of its final cooked state. Such half-cooking forms cake bar of sufficient hardness to resist undesirable moisture resistance, even when the cake bar is exposed to water for prolonged periods of time. The cake bar must be exposed to water at a temperature in excess of approximately 200 degrees fahrenheit before it absorbs a substantial quantity of water. Thus, cake bar or noodles, may be stored for prolonged periods of time without becoming soft and/or soggy, thus retaining their desirable crunchy state.

When the grain cake health soup of the present invention is prepared for consumption, the cake bar, along with the broth mixed therewith, is cooked to a fully-cooked state such that the cake bar has a desired firm and crunchy texture.

In the preferred embodiment of the present invention, the grain cake health soup comprises approximately 50 percent cake and approximately 50 percent meat and/or bone soup. Those skilled in the art will recognize that various other proportions of cake and meat and/or bone soup may be provided, as desired.

The grain powder preferably comprises at least one of rice, corn, beans, wheat, and momil. The first mixture is preferably mixed and cooked within a pressure boiler. The first mixture is preferably pressed with a roller press so as to remove a quantity of water therefrom and thereby form a cake which is configured as a bar.

Seasoning is optionally added to the salt, water, and starch which is mixed with the grain powder. Similarly, seasoning is optionally added to the salt and water mixed with the meat and/or bone.

The meat and/or bone is preferably mixed with salt and water and cooked a first time in a pressure boiler. The second mixture may optionally be cooked a second time preferably within a conventional boiler.

The hardness of the grain cake is crucial to its ability to resist excess water absorption. The hardness of the grain cake is determined both by the degree of cooking and the quantity of grain, water, and starch utilized in the formation thereof. The preferred quantities of grain water, and starch are 300 pounds of grain, i.e., rice powder, 10 liters of water, and 1.5 pounds of starch. The grain cake is preferably cooked at approximately 300 degrees fahrenheit for 15 minutes at 5 psi. Thus, grain cake is provided which does not substantially absorb water at ambient temperature. However, when cooked, the temperature of the water is increased and the grain cake then absorbs additional water to become fully cooked and attain the desired consistency and texture.

Figure 5:
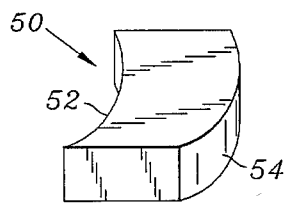
FIG. 5 is a perspective view of a preferred embodiment of a single portion of the cut cake bar, according to the present invention having a cross-section configured as a rectangle.
Figure 6:
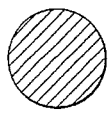
FIG. 6 is a cross sectional end view of the cake portion of FIG. 2.
Figure 8:
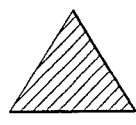
FIG. 8 is a cross section end view of the portion of cake bar of FIG. 4.
Figure 7:
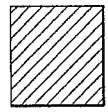
FIG. 7 is a cross sectional end view of the cake portion of FIG. 3.
Figure 9:
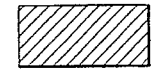
FIG. 9 is a cross sectional end view of the portion of cake bar of FIG. 5.

Referring now to FIGS. 2–9, cake bar having a cross-section configured as a circle (FIGS. 2 and 6), square (FIGS. 3 and 7), triangle (FIGS. 4 and 8) and a rectangle are illustrated. In the preferred embodiment of the present invention the cake bar is configured to have a cross-section configured as a rectangle (FIGS. 5 and 9). Those skilled in the art will recognize that various other cross-section configurations are likewise suitable.

With particular reference to FIG. 5 and 9, the rectangular cake bar is cut or broken into pieces 50 which are generally rectangular in configuration and preferably have a generally inwardly bowed or concave surface 52 formed at one end thereof and a generally outwardly bowed or convex surface 54 formed at an opposed end thereof. Thus, each individual piece of the cake bar is cut so as to generally resemble a fingernail clipping. It has been found that such configuration of the cut cake bar portions allows the cut cake bar portions to resist clumping and/or excessive wetting after being disposed with the soup in a container. Thus, the curved shape of the cut bar portions prevent the portions from sticking to one another and thus clumping undesirably.

Figure 10:
FIG. 10 is a perspective view of a tray container according to the present invention.
Figure 11:
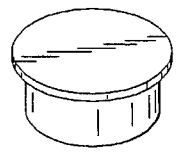
FIG. 11 is a perspective view of a tub container according to the present invention.
Figure 12:
FIG. 12 is a perspective view of a pouch container according to the present invention.

Referring now to FIGS. 10–12, as those skilled in the art will recognize, various different types of containers are suitable for the practice of the present invention. Since the preferred embodiment of the grain cake health soup of the present invention is provided in frozen form, TV dinner trays (FIG. 10), plastic tubs (FIG. 11), and paper or plastic pouches, preferably aluminized, (FIG. 12), are particularly suited for use therewith.

The method for forming soup according to the present invention may similarly be utilized to produce other frozen foods such as macaroni, fried rice, noodles, linguine, and various other steamed or boiled food products, wherein according to contemporary methodology a noodle or a noodle-like component thereof is dispensed into a container such that it is stored substantially apart from a moisture containing component thereof until heated. The methodology of the present invention eliminates the need to keep the noodle-like component substantially separated from the moisture containing component. Thus, such noodle-like components can be mixed with various vegetables, gravies, meats, and other ingredients and stored for prolonged periods in a frozen state while still maintaining a desired crunchy texture upon cooking.

Figure 13:
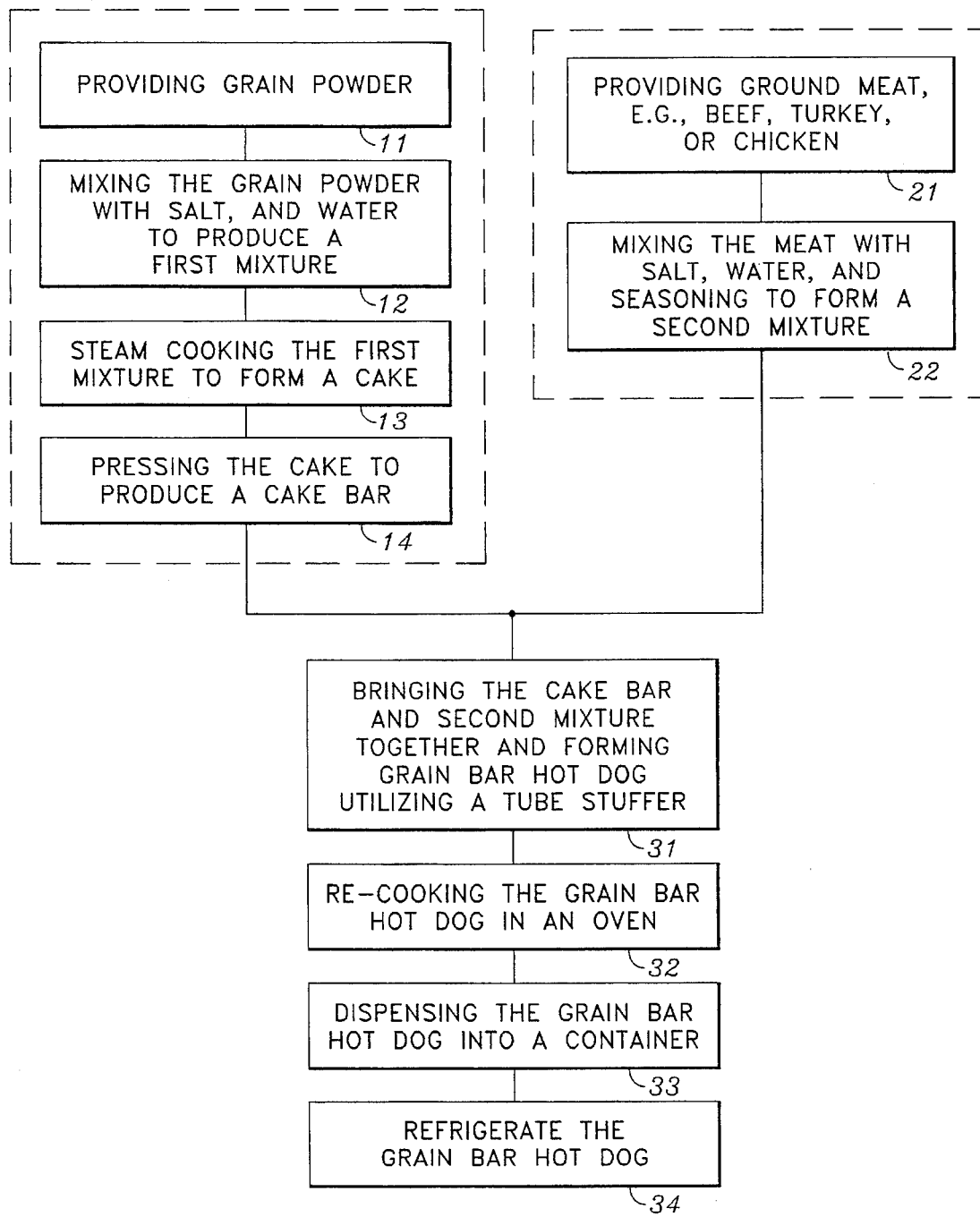
FIG. 13 is a block diagram illustrating the steps for practicing the method for producing a cake bar hot dog according to the present invention.

Referring now to FIGS. 13–18, the method for forming the grain hot dog according to the present invention is illustrated. With particular reference to FIG. 13, the method comprises the steps of providing grain powder 11; mixing the grain powder with salt and water to produce a first mixture 12; steam cooking the first mixture to form a cake 13; and pressing the cake to make a cake bar 14. Ground meat, e.g., sausage, pork, beef, turkey, chicken, etc., is provided 21; and the meat is mixed with salt, water, and seasoning to form a second mixture 22. The meat of the second mixture may be completely cooked, partially cooked, or not cooked at all prior to mixing with the salt, water, and seasoning. Alternatively, the second mixture may then be completely cooked, partially cooked, or not cooked at all, as desired.

The cake bar and second mixture are brought together and the grain hot dog is formed utilizing a tube stuffer 31. The grain hot dog is then re-cooked in an oven 32; and the cooked grain hot dog is dispensed into a container 33. The grain hot dog is then refrigerated or frozen 34 for transportation and/or storage.

Figure 14:
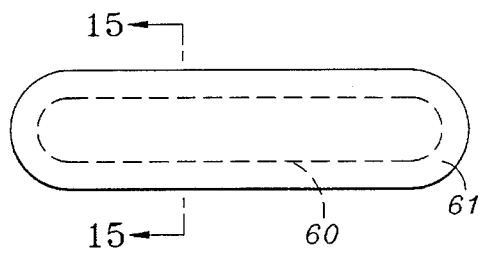
FIG. 14 is a side view of the cake bar hot dog of the present invention.
Figure 15:
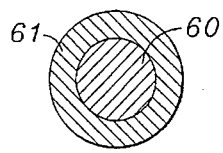
FIG. 15 is a cross-sectional side view of the grain hot dog taken along lines 15 of FIG. 14.

With particular reference to FIGS. 14 and 15, the grain hot dog of the present invention comprises an inner layer 60 and an outer layer 61 formed about the inner layer. One of the two layers 60 and 61 is comprised of cake bar and the other of the two layers 60 and 61 is comprised of meat. Thus, the meat may either form the inner 60 or outer 61 layer with the cake bar forming the other layer 60 or 61, as desired.

Figure 16:
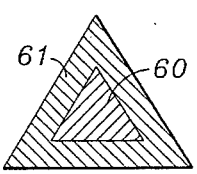
FIG. 16 is a cross-sectional side view of a first alternative configuration of the grain hot dog of the present invention.
Figure 17:
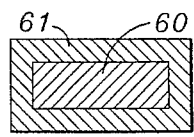
FIG. 17 is a cross-sectional side view of a second alternative configuration of the grain hot dog of the present invention.
Figure 18:
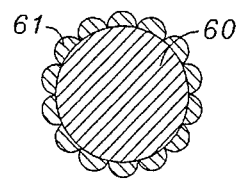
FIG. 18 is a cross-sectional side view of a third alternative configuration of the grain hot dog of the present invention.

As illustrated in FIGS. 16, 17, and 18, various different alternative configurations of the grain hot dog of the present invention are contemplated. For example, the grain hot dog of the present invention may have a triangular (FIG. 16), rectangular (FIG. 17), or various other (such as FIG. 18) configurations.

The step of forming the grain hot dog utilizing a tube stuffer may be performed by utilizing two different sizes of tube stuffers wherein the inner layer 60 is first formed in the smaller of the two tube stuffers and the resulting inner layer 60 is then added to the larger of the two tube stuffers along with the material for the outer layer 61 to form the grain hot dog of the present invention.

Alternatively, the inner layer 60 may be formed utilizing a tube stuffer and the outer layer 61 added thereto via various different methodologies. For example, the material of the outer layer 61 could be rolled onto the material of the inner layer 60 and/or hand-formed thereto. Those skilled in the art will recognize that various methods for forming the outer layer 61 to the inner layer 60 are likewise suitable.

It is understood that the exemplary method for producing grain cake health soup and grain hot dog TV dinners described herein and shown in the drawings represents only a presently preferred embodiment of the invention. Indeed, various modifications and additions may be made to such embodiment without departing from the spirit and scope of the invention. For example, the cake may be formed from various different grains. Also, various types of meats and/or bone and vegetables are contemplated for use in the water-saturated component of the soup. Various different types of meat are suitable for the grain hot dog and the use of various different types of grain are similarly contemplated. Thus, these and other modifications and additions may be obvious to those skilled in the art and may be implemented to adapt the present invention for use in a variety of different applications.

What is claimed is:

1. A method for producing grain cake health soup, said method comprising the steps of:
   a) preparing grain cake according to the steps of:
      i) providing grain powder;
      ii) mixing the grain powder with salt, water, and starch to produce a first mixture;
      iii) cooking the first mixture to form a cake;
      iv) pressing the cake to form a cake bar;
      v) freeze drying the cake bar to remove a quantity of water therefrom;
      vi) slicing the cake bar;
      vii) partially recooking the sliced cake bar;
   b) separately preparing at least one of meat and bone according to the steps of:
      i) providing at least one of meat and bone;
      ii) mixing at least one of meat and bone with salt and water to produce a second mixture;
      iii) cooking the second mixture to form a broth;

iv) cooling the broth;

c) mixing the sliced cake bar and broth to form soup; and d) dispensing the soup into a container; and e) freezing the soup.

2. The method as recited in claim 1 wherein said grain powder comprises at least one of rice, corn, beans, wheat, and momil.

3. The method as recited in claim 1 wherein the step of cooking the first mixture comprises cooking the first mixture in a pressure boiler.

4. The method as recited in claim 1 wherein the step of pressing the comprises pressing the cake with a roller press.

5. The method as recited in claim 1 wherein the step of pressing the cake to form a cake bar comprises pressing the cake to form a cake bar having a generally rectangularly cross-sectional configuration.

6. The method as recited in claim 5 further comprising the step of cutting the cake bar into generally rectangular portions, each portion having a generally inwardly bowed first surface and an opposed generally outwardly bowed second surface.

7. The method as recited in claim 1 wherein the step of mixing the grain powder with salt, water, and starch comprises mixing the grain powder with salt, water, starch, and seasoning.

8. The method as recited in claim 1 wherein the step of mixing at least one of meat and bone with salt and water comprises mixing at least one of meat and bone with salt, water, and seasoning.

9. The method as recited in claim 1 wherein the step of cooking the second mixture to form a broth comprises cooking the second mixture a first time in a pressure boiler.

10. The method as recited in claim 1 wherein the step of dispensing the soup into a container comprises dispensing the soup into a tray.

11. The method as recited in claim 1 wherein the step of dispensing the soup broth into a container comprises dispensing the soup into a tub.

12. The method as recited in claim 1 wherein the step of dispensing the soup into a container comprises dispensing the soup into a pouch.

13. The method as recited in claim 1 wherein the step of mixing the grain powder with salt, water, and starch to produce a first mixture comprises mixing the grain powder with salt, water, and starch such that the weight of the starch is at most one percent of the weight of the grain powder.

14. The method as recited in claim 1 wherein the sliced cake bar comprises approximately 50 percent of the container's contents and the broth comprises approximately 50 percent of the container's contents.

15. A method for producing grain cake health soup, said method comprising the steps of:

a) preparing grain cake according to the steps of:
   i) providing grain powder comprised of at least one of rice, corn, beans, wheat, and momil;
   ii) mixing the grain powder with salt, water, and starch to produce a first mixture in a pressure boiler;
   iii) cooking the first mixture in a pressure boiler;
   iv) pressing the first mixture with a roller press to form a cake bar;
   v) a freeze drying the cake bar to remove a quantity of water therefrom;
   vi) cutting the cake bar into generally rectangular portions having a generally inwardly bowed first surface and an opposed generally outwardly bowed second surface;
   vii) partially cooking the cut cake bar portions;

b) separately preparing at least one of meat and bone according to the steps of:
   i) providing at least one of meat and bone;
   ii) mixing at least one of meat and bone with salt and water to produce a second mixture in a pressure boiler;
   iii) cooking the second mixture in the pressure boiler to form a broth;
   iv) cooling the broth;

c) mixing the cut cake bar portions and broth to form a soup;

d) dispensing the soup into a container; and e) freezing the soup.

* * * * *